United States Patent [19]
Dillard

[11] 3,889,257
[45] June 10, 1975

[54] BROADBAND RADAR SIGNAL SAMPLER UTILIZING TELEVISION SCANNING

[75] Inventor: George M. Dillard, San Diego, Calif.

[73] Assignee: The United States of Amercia as represented by the Secretary of the Navy, Washington, D.C.

[22] Filed: Apr. 1, 1974

[21] Appl. No.: 457,147

[52] U.S. Cl. ............................................... 343/6 TV
[51] Int. Cl. ............................ G01s 7/42; G01s 9/02
[58] Field of Search .......................... 343/5 SC, 6 TV

[56] References Cited
UNITED STATES PATENTS
| | | | |
|---|---|---|---|
| 3,127,607 | 3/1964 | Dickey, Jr. ...................... | 343/17.1 R |
| 3,136,994 | 6/1964 | Daspit ............................. | 343/17.1 R |
| 3,569,966 | 3/1971 | Dunn et al. .................... | 343/6 TV X |
| 3,724,783 | 4/1973 | Nolan, Jr. et al. ............. | 343/6 TV X |

FOREIGN PATENTS OR APPLICATIONS
| | | | |
|---|---|---|---|
| 618,873 | 3/1949 | United Kingdom ............... | 343/6 TV |

Primary Examiner—Malcolm F. Hubler
Attorney, Agent, or Firm—R. S. Sciascia; G. J. Rubens; H. Fendelman

[57] ABSTRACT

Apparatus for sampling high-resolution radar data to reduce its bandwidth and facilitate digital recording thereof. Radar data in the form of target signatures displayed on an oscilloscope is viewed by high-resolution TV camera which is scanned by a special pattern which eliminates interlacing of vertical scans. The oscilloscope picture is obtained by converting the camera video into digital form.

5 Claims, 7 Drawing Figures

3,889,257

BROADBAND RADAR SIGNAL SAMPLER UTILIZING TELEVISION SCANNING

BACKGROUND OF THE INVENTION

In high-range resolution radars, range profiles of targets are obtained for classification or identification. If the resolution cell size (in range) is much smaller than the range extent of typical targets, the fine structure of a target will produce returns that are unique for a particular target. However, the high resolution necessary for resolving individual scattering points on the target requires transmitted signals of large bandwidth, which in turn, require extremely high-speed equipment for recording and processing received signals.

For example, to achieve range resolution of approximately one-foot requires a signal bandwidth of approximately 500-MHz and a sampling rate for reconstructing target signatures of $5 \times 10^8$ samples per second. Such sampling rate cannot be attained directly with state-of-the-art apparatus especially if the sampled data are converted to binary numbers of more than four bits.

SUMMARY OF THE INVENTION

Apparatus are disclosed for sampling high-resolution data to effectively reduce its bandwidth and for reconstructing target signatures. A high-resolution, closed-circuit TV camera and a broadband oscilloscope are utilized to achieve the results. Radar data (signature) is obtained by the oscilloscope which is viewed by the TV camera. The camera is scanned by a special scanning pattern which allows the oscilloscope picture to be obtained by converting the camera video to digital form. The scanning pattern is obtained by changing the vertical scan rate to avoid interlacing and rotating the camera by 90° from its normal position. The TV camera is focused on the oscilloscope screen which contains the waveform to be sampled whereby the vidicon "sees" a dark background except at the instants when the trace crosses the waveform. To obtain a digital output that represents the displayed waveform, a counter begins counting at a constant rate each time a trace starts and stops counting when the video crosses a preset threshold.

OBJECTS OF THE INVENTION

It is the primary object of the present invention to provide novel radar sampling apparatus for effectively reducing the bandwidth of high-resolution radar data.

It is another object of the present invention to provide high-range resolution apparatus for achieving sampling rates in the order $5 \times 10^8$ samples per second for reconstructing target signatures to achieve range resolution in the order of 1-foot.

It is a further object of the present invention to provide high-resolution radar sampling techniques which can be used to obtain digital replicas of oscilloscope waveforms.

Other objects, advantages and novel features of the invention will become apparent from the following detailed description of the invention when considered in conjunction with the accompanying drawings.

DESCRIPTION OF THE PREFERRED EMBODIMENT

In conventional, closed-circuit TV systems, scanning comprises a repetitive horizontal line which progresses from left to right and from top to bottom of a viewed picture. A complete picture (frame) consists of, for example, 525 lines. The normal vertical scan rate is 60 scans per second, and a complete picture or frame requires two vertical scans. Thus, complete pictures are obtained at a 30-Hertz rate. The timing between the horizontal and vertical scan is such that 262½ horizontal scans occur for every vertical scan (assuming a 525-line system). This characteristic creates interlacing of each vertical scan with the next. Interlacing is used in TV systems to increase the flicker rate from 30- to 60-Hertz, however, for the sampling concept to be disclosed herein interlacing is undesirable, and therefore it is not utilized.

The concept to be disclosed herein for reducing the bandwidth of high-resolution radar data and for obtaining digital replicas of oscilloscope waveforms can readily be understood with reference to FIGS. 1–6.

Figure 1:
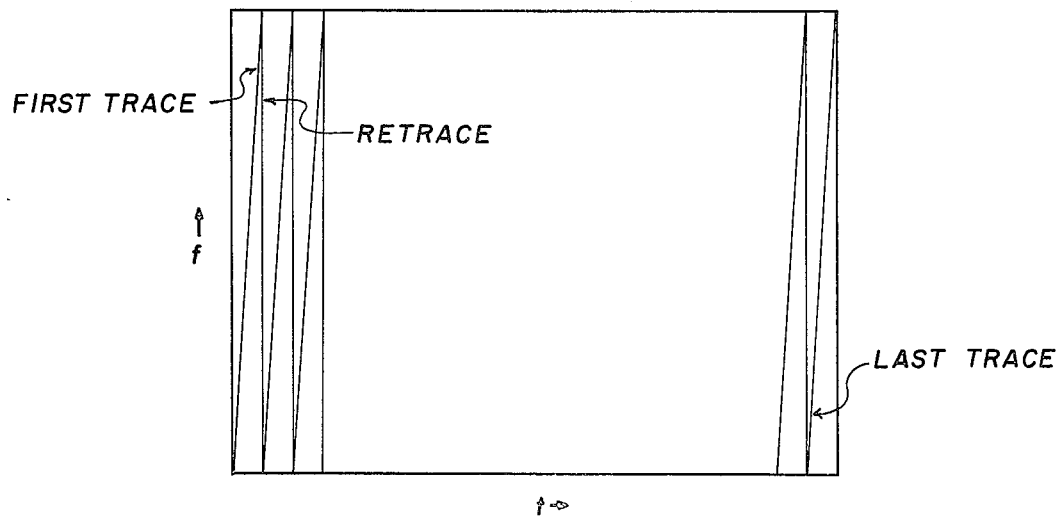
FIG. 1 is a graphical representation of the preferred scanning pattern utilized in accordance with the present inventive concept.
Figure 2:
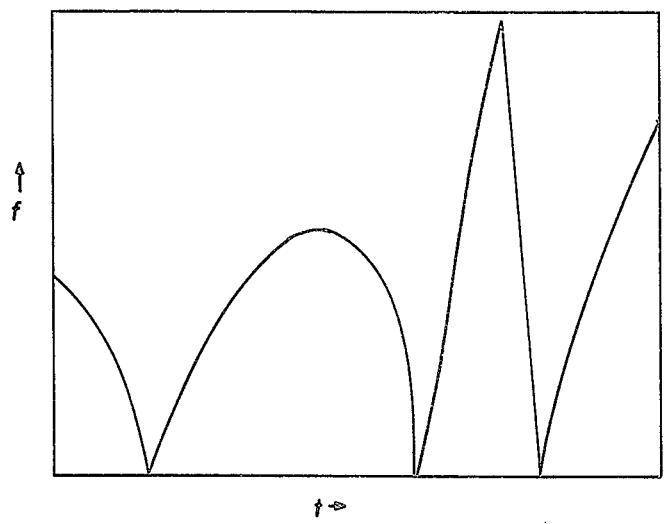
FIG. 2 is a graphical, exemplary representation of a waveform to be sampled by the apparatus of FIG. 6.

The scanning pattern used in the concept and shown in FIG. 1 is obtained by changing the vertical scan rate of the camera to avoid interlacing and by rotating the camera by an angle of 90°. For example, changing the vertical scan rate from 60-Hertz to 30-Hertz results in 525 non-interlaced lines in a conventional 525-line system.

Figure 3:
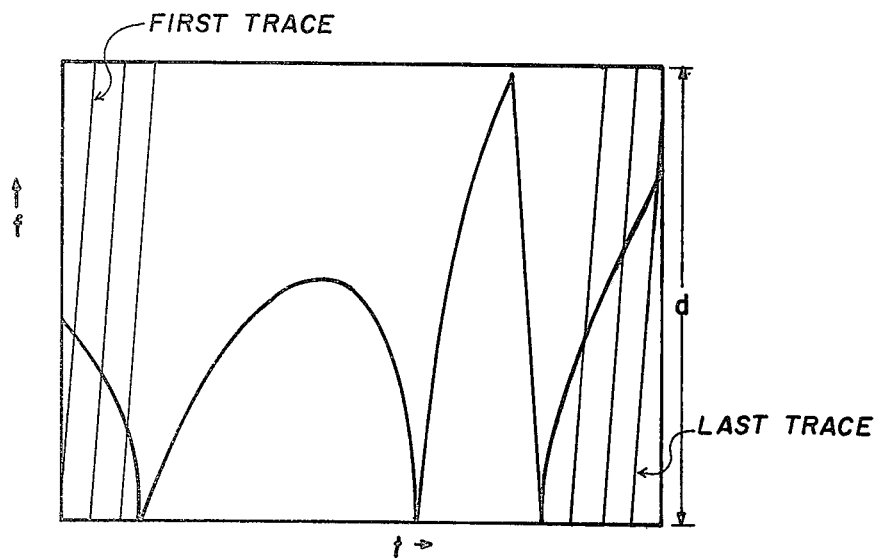
FIG. 3 is a graphical representation of the waveform of FIG. 2 being sampled by the apparatus of FIG. 6.
Figure 4:
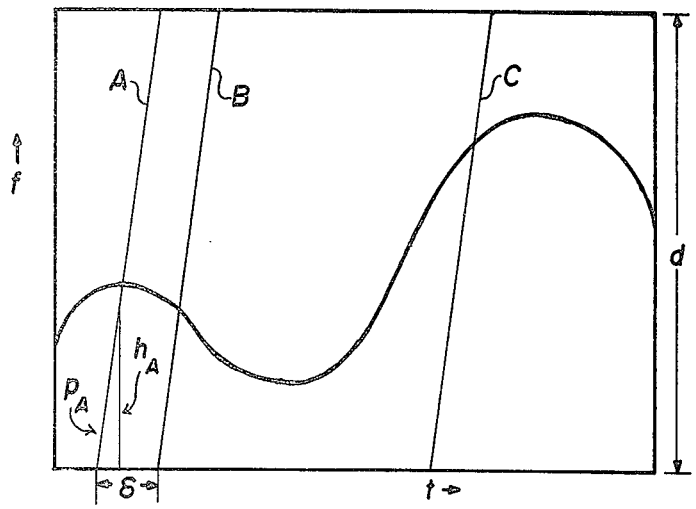
FIG. 4 is a graphical representation of the waveform recording geometry.
Figure 5:
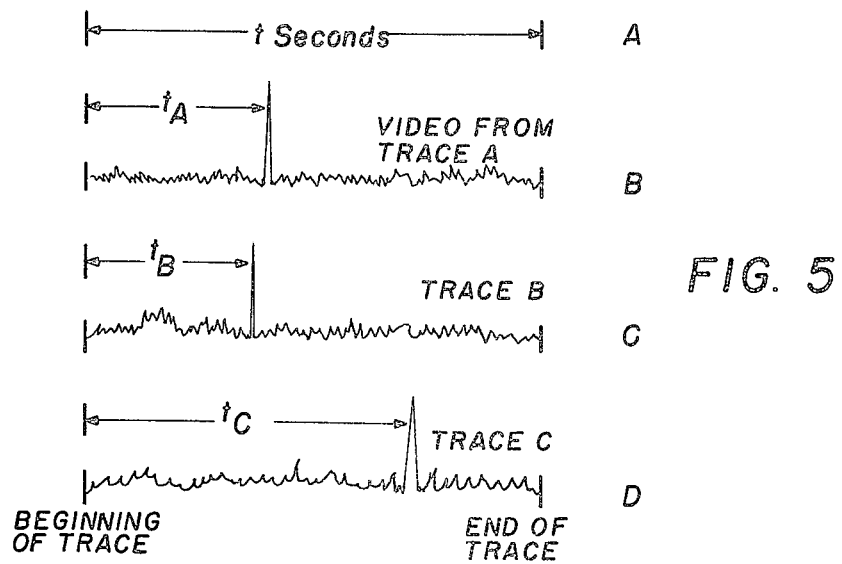
FIG. 5(a–d) represents graphically the timing relationships of video returns.

Furthermore, the scanning pattern can be generated to provide any desired scanning within the limits imposed by the camera circuitry and the vidicon. If the TV camera is focused on an oscilloscope screen that contains the exemplary waveform of FIG. 2, the vidicon sees a dark background except at the instants when the trace crosses the waveform. This is indicated in FIG. 3 which consists of FIGS. 1 and 2 superimposed upon each other.

As shown in FIGS. 5(a)–5(d), if the video from the camera is observed, spikes occur whenever the traces (A, B, and C) cross the waveform. The time of occurrence of these spikes, $t_A$, $t_B$, and $t_C$, measured from the beginning of each trace, is approximately proportional to the height (e.g., $h_A$) of the waveform at the time corresponding to the location of that trace on the oscilloscope screen. The trace slopes slightly away from the vertical because of the scanning patterns.

Therefore the path traversed by the trace is slightly longer than the waveform height at the point of crossing. Thus in FIG. 4, $h_A = P_A/[1 + (\delta/d)^2]^{1/2}$, where $\delta$ is the distance between adjacent traces. If the number of traces per waveform is large, then $\delta$ is small and $h_A \approx P_A$.

If the trace moves at a constant rate and if the total time taken for each trace to traverse the screen is equal to T seconds, then $h_A = dt_A/T$, where $t_A$ is equal to the time (measured from the beginning of the trace) at which the trace crosses the waveform as shown in FIG. 5(b). Thus, to obtain the digital output that represents the displayed waveform, a counter which is initially at zero at the beginning of each trace begins counting at a constant rate whenever each trace begins. The counter is inhibited whenever the video crosses a preset threshold.

When inhibited, the counter content represents the desired digital output. The counting rate is adjusted so that the desired representation accuracy is obtained. For example, if the total time required for each trace to traverse the oscilloscope screen is 51.2-microseconds and if the counting rate is 5-MHz, then the conversion is equivalent to 8-bits.

Figure 6:
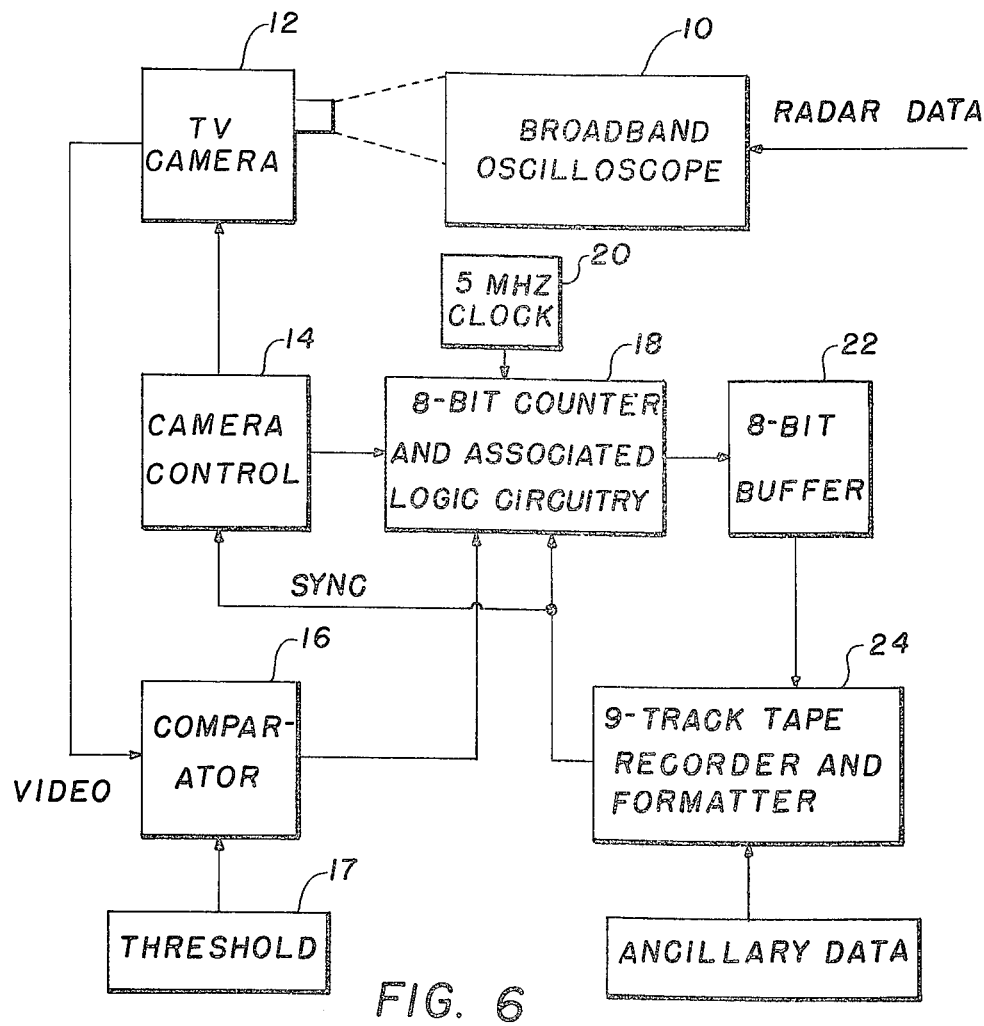
FIG. 6 is a simplified block diagram of the sampling and recording apparatus embodying the present inventive concept; and, FIG. 7 is a block diagram of the camera control unit of FIG. 6.

FIG. 6 represents in simplified block diagram from apparatus embodying the above described concept. Incoming radar data are displayed on the screen of the broadband oscilloscope 10 which is not a sampling oscilloscope. Timing circuitry associated with displaying the data are not shown. The oscilloscope screen is viewed by the TV camera 12.

The scanning of the camera is controlled by the camera control unit 14 to provide, for example, a horizontal sweep of 64-microseconds and 512-horizontal sweeps per scan.

The vertical sweep is obtained from programmable, count-down circuitry and a digital-to-analog converter in the unit 14 so that the vertical sweep time can be varied. If the horizontal sweep time is held constant, varying the vertical sweep time varies the number of horizontal sweeps per scan. The number 512 was chosen for purposes of illustration solely.

The video output from the camera is fed to the comparator 16 for comparison with a fixed threshold from the circuit 17 to determine the time at which the video spikes occur. The comparator output inhibits the 8-bit counter 18 which starts counting at a 5-MHz rate at the beginning of each horizontal sweep as commanded by the clock 20. Immediately prior to the beginning of each horizontal sweep, the contents of the counter (which represents the count obtained from the horizontal sweep just concluded) are transferred to an 8-bit buffer 22 for recording by the unit 24.

The recorder unit 24 can comprise a 9-track, 800-bits per inch, Kennedy Recorder Model 8109 used with a Kennedy formatter model 8208. The recording rate is synchronized with the horizontal sweep rate of the TV camera so that the recording period is 64-microseconds, for example.

A complete picture, using the exemplary parameter values, is produced by the TV camera every 32.7-milliseconds. During this time, the tape will have moved approximately ⅝ of an inch. To facilitate computer processing of the recorded data only alternate pictures or digital replicas of the oscilloscope waveform are recorded. During the time in which data are not being recorded an inter-record gap is produced on the tape. The length of the gap is the same as the length of the recorded waveform. That is, a recorded tape will have gaps of approximately ⅝ inch each followed by a data block of the same length.

Ancillary data such as date, time, range, etc., are recorded at the beginning of each waveform recording. The first 7½ tape characters of each recording can be utilized for these ancillary data, resulting in a 60-bit word when the tape is read by the computer.

Figure 7:
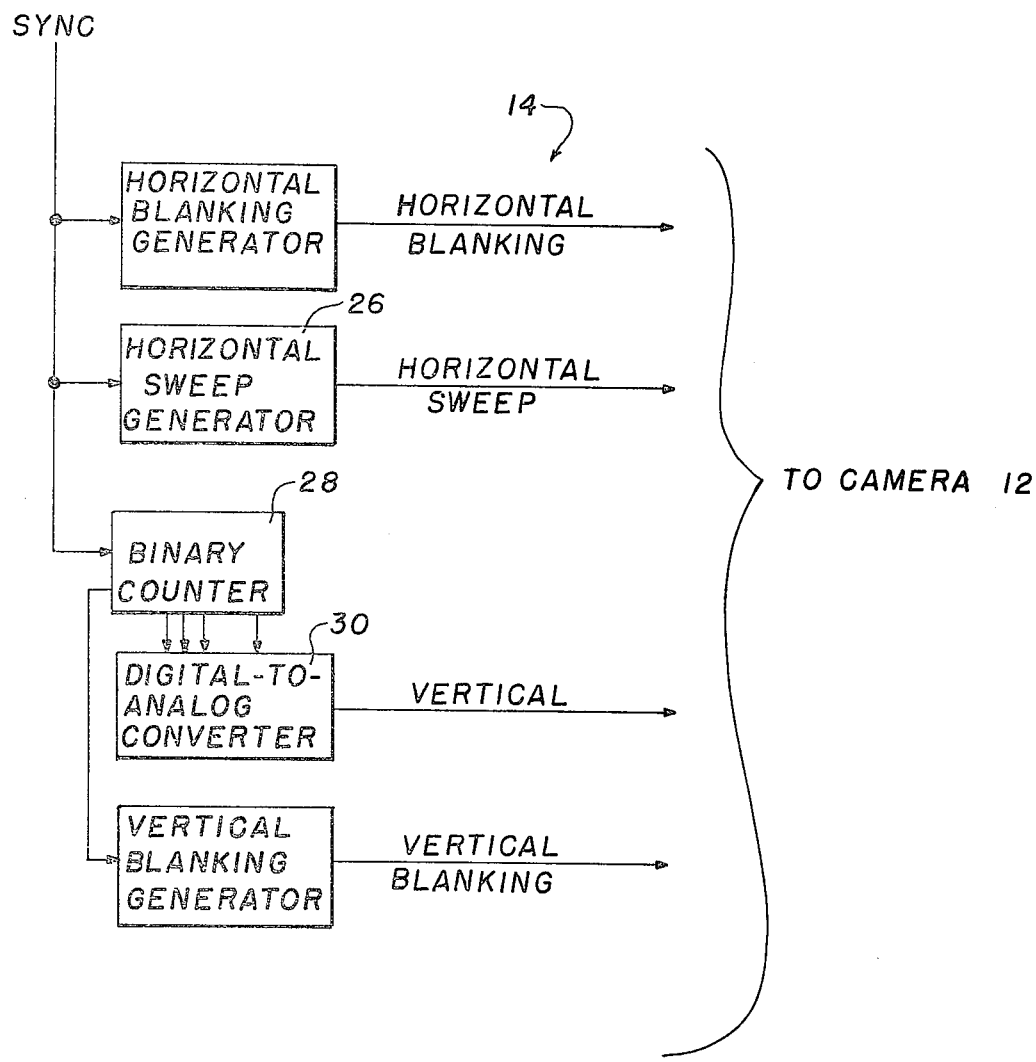

The camera control 14 is shown in detail in FIG. 7. The sync pulses from the tape recorder/formatter 24 occur with a period of, for example, 64-microseconds, and the horizontal sweep generator 26 generates a sweep having a duration of approximately 64-microseconds. The sync pulses are also counted down in the binary counter 28, the output of which is converted to an analog staircase ramp by the D/A converter 30. By choosing the inputs to the O/A converter, the vertical sweep can be made to encompass a selectable number of horizontal sweeps. For example, as discussed above, there are 512-horizontal sweeps per vertical sweep. The camera control also generates horizontal and vertical blanking signals at appropriate times (during retrace) and provides AGC and other necessary controls to the vidicon circuitry within the camera in a conventional manner. Although the sync pulses are shown produced by the tape recorder/formatter 24, the sync could also be an input from some other source (e.g., from a radar prf generator) or be generated by a conventional oscillator circuit within the camera control.

The sampling method described can be applied to effectively reduce the bandwidth of high resolution radar data, and the resultant bandwidth reduction facilitates the recording of data on digital apparatus for subsequent computer processing.

Obviously many modifications and variations of the present invention are possible in the light of the above teachings. It is therefore to be understood that within the scope of the appended claims the invention may be practiced otherwise than as specifically described.

What is claimed is:

1. Apparatus for sampling high-resolution radar data and comprising:
    broadband oscilloscope means for displaying incoming radar signals on its screen;
    television camera means positioned directly in front of said oscilloscope for viewing said screen, said camera being rotated 90° from its normal position relative to said screen;
    camera control means connected at its output to said camera for providing sweep signals thereto, and including means for providing a vertical sweep signal which eliminates interlacing of the vertical scans;
    a signal source connected at its output to said camera control means for providing a sync signal thereto;
    comparator means connected to the video output of said camera and being responsive thereto to produce an output signal whenever said video signal exceeds a selectively predetermined threshold level; and,
    binary counter means connected to the output of said camera control means for counting at a selectively predetermined rate at the beginning of each horizontal sweep therefrom, and further being connected to the output of said comparator and being responsive thereto to stop counting each time an output is received therefrom.

2. The apparatus of claim 1 wherein said means for providing said vertical sweep comprises binary counter means connected at its output to said signal source for counting down said sync signal, and D/A converter means connected to the output of said counter means to produce said vertical sweep.

3. The apparatus of claim 2 wherein said camera control means includes means for generating horizontal and vertical blanking signals in response to said sync signal.

4. The apparatus of claim 3 further including digital recorder means connected to the output of said counter means.

5. A method for reconstructing high-resolution radar signatures comprising the steps of displaying incoming radar data, viewing said displayed data by means of a TV camera rotated 90° from its normal position relative to said means for displaying said radar data, scanning said camera so that interlacing of vertical scans is eliminated to produce video representations of said data, converting said representations into digital counts every horizontal sweep period.

* * * * *